United States Patent [19]

Naudin et al.

[11] Patent Number: 4,905,539
[45] Date of Patent: Mar. 6, 1990

[54] DOUBLE DAMPED FLYWHEEL, PARTICULARLY FOR AUTOMOTIVE VEHICLES

[75] Inventors: Jacky Naudin, Ermont; Jacques Paquin, Villeneuve-la-Garenne, both of France

[73] Assignee: VALEO, Paris, France

[21] Appl. No.: 300,839

[22] Filed: Jan. 24, 1989

[30] Foreign Application Priority Data

Jan. 25, 1988 [FR] France ................... 88 00806

[51] Int. Cl.⁴ ............................................. F16F 15/10
[52] U.S. Cl. .................................. 74/574; 192/106.2; 464/68
[58] Field of Search ............................ 74/574, 573 F; 192/106.1, 106.2; 464/7, 24, 27, 28, 64, 66, 68

[56] References Cited

U.S. PATENT DOCUMENTS

| 4,760,754 | 8/1988 | Friedmann ........................ 74/574 |
| 4,767,380 | 8/1988 | Chassequet et al. . |
| 4,777,843 | 10/1988 | Bopp ............................. 192/106.2 |

FOREIGN PATENT DOCUMENTS

| 0251849 | 1/1988 | European Pat. Off. . |
| 3712876 | 11/1987 | Fed. Rep. of Germany ... 192/106.2 |
| 2180322 | 3/1987 | United Kingdom ................. 464/68 |
| 2193789 | 2/1988 | United Kingdom ............. 192/106.2 |
| 2197428 | 5/1988 | United Kingdom ................. 464/68 |
| 2198212 | 6/1988 | United Kingdom ................. 464/68 |

Primary Examiner—Rodney M. Lindsey
Attorney, Agent, or Firm—Charles E. Brown; Charles A. Brown

[57] ABSTRACT

The present invention is concerned with a double damped flywheel for automotive vehicles having a mass (20) including at least one damper plate (11) and a reaction plate (14). In accordance with the invention, circumferentially acting delayed action coupling means (30, 130), defining a clearance for initial relative rotational displacement, are provided between the reaction plate and the damper plate so as to establish a common rotation of these two plates after the clearance has been taken up.

9 Claims, 3 Drawing Sheets

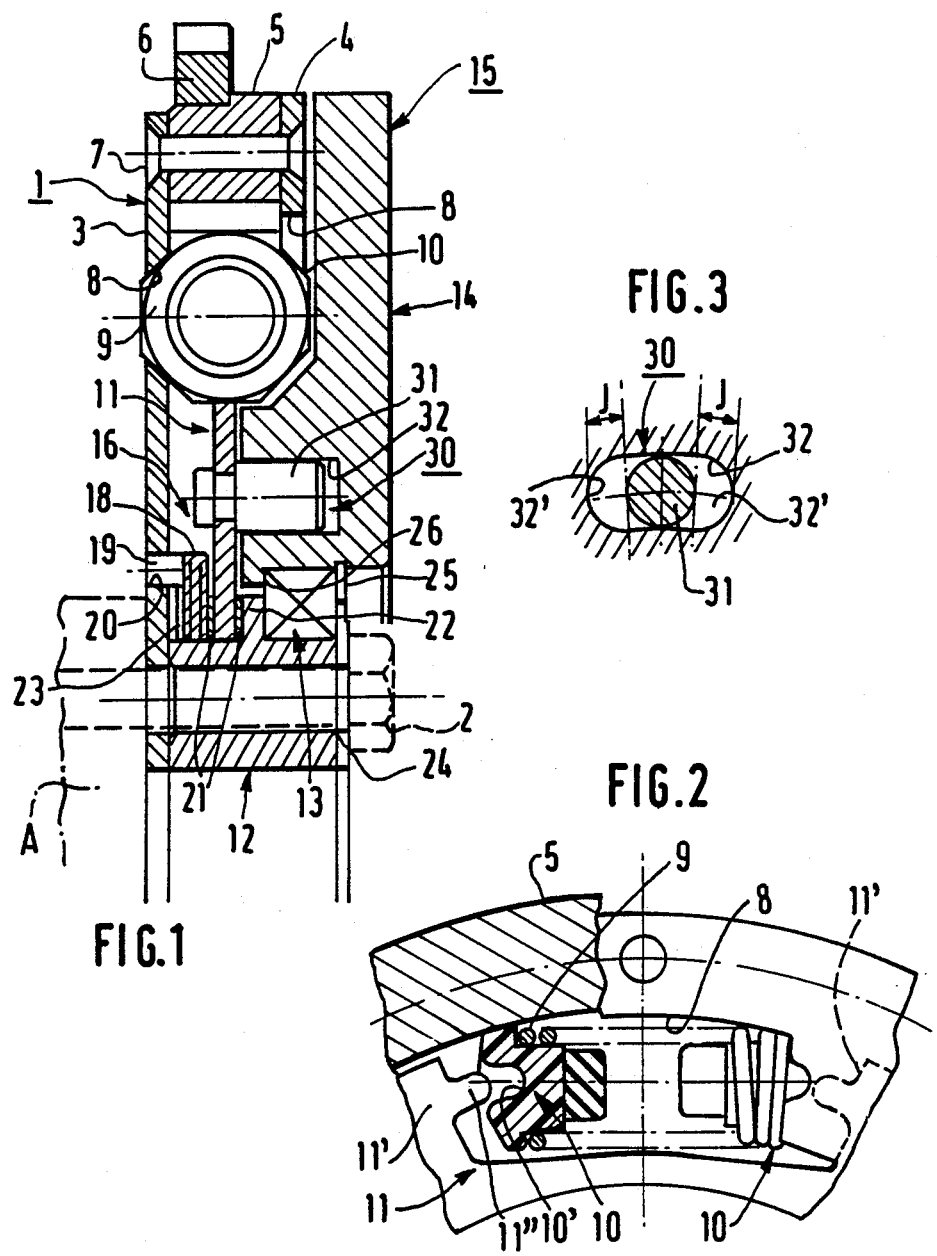

DOUBLE DAMPED FLYWHEEL, PARTICULARLY FOR AUTOMOTIVE VEHICLES

FIELD OF THE INVENTION

The present invention is concerned with a double damped flywheel, particularly for automotive vehicles, of the kind comprising two coaxial masses which are mounted so as to be rotatable relative to each other, namely a first mass which includes at least one face plate, and a second said mass which includes at least one damper plate and a reaction plate, a support member to which the first mass is fixed, bearing means mounted between the reaction plate and the support member, circumferentially acting resilient means mounted between the masses, and damping means mounted between the masses, the resilient means and damping means being such as to act on both masses.

BACKGROUND OF THE INVENTION

Such a double flywheel is described in the French published patent application No. FR 2 593 871A, which describes damping means in which friction rings comes into operation as from the commencement of the relative angular movement between the masses. This arrangement cannot be entirely satisfactory, especially in respect of the effective removal of dead point noises when the engine of the vehicle is running in a decelerating mode. This is because the friction cannot be made as small as is desirable.

SUMMARY OF THE INVENTION

An object of the present invention is to overcome this disadvantage, by turning the construction of the double flywheel to better account. This also produces other advantages.

According to the invention, a double damped flywheel of the kind defined above is characterised in that delayed action coupling means defining a circumferential clearance for initial relative rotational displacement between the reaction plate and the damper plate are arranged between these plates in such a way as to produce a common rotation of the reaction plate and the damper plate after the clearance has been taken up.

In operation of the arrangement according to the invention, during a first phase of operation, a relative movement takes place within the second mass between the damper plate and the reaction plate through the bearing means, in such a way that the damping means do not operate until the clearance has been taken up. The damping effect can thus, resulting partly from the provision of the bearing means, be made minimal during the first phase, so that satisfactory removal of dead point noises can be obtained.

In one embodiment, the delayed action coupling means through which the reaction plate and the damper plate are engaged with each other, comprise a projection which may for example be carried by the reaction plate and which engages with a suitable clearance in an opening formed in the damper plate and delimited by circumferential edges of the two plates. The inverse of this arrangement is of course equally possible. These arrangements enable the double flywheel to be made very compact in the axial direction. The projection may comprise a pin engaging in a generally oblong hole or slot. In a modification, the projection may be in the form of a tenon engaging a mortice, again with clearance.

The damping means are preferably, according to another feature of the invention, located axially on the support member associated with the first mass, so that the damper plate and reaction plate can be maintained spaced from each other. The support member is typically a hub of the double flywheel. The damper plate is preferably centered by the first mass. All these arrangements lead to a reduction in friction during the first phase of operation.

The description which follows describes preferred embodiments of the invention, by way of example only, in the context of a double damped flywheel for use in the transmission system of an automobile. The examples described are illustrated in the accompanying drawings.

BRIEF DESCRIPTION OF THE DRAWINGS

FIG. 1 is a view in axial cross-section of one half of a double flywheel according to the invention.

FIG. 2 is a scrap view seen in the axial direction, and shows the means for actuating the resilient means seen in FIG. 1.

FIG. 3 is a scrap view, again seen in the axial direction, showing a relative rotational displacement means according to the invention, in a first embodiment.

DESCRIPTION OF PREFERRED EMBODIMENTS

Figure 4:
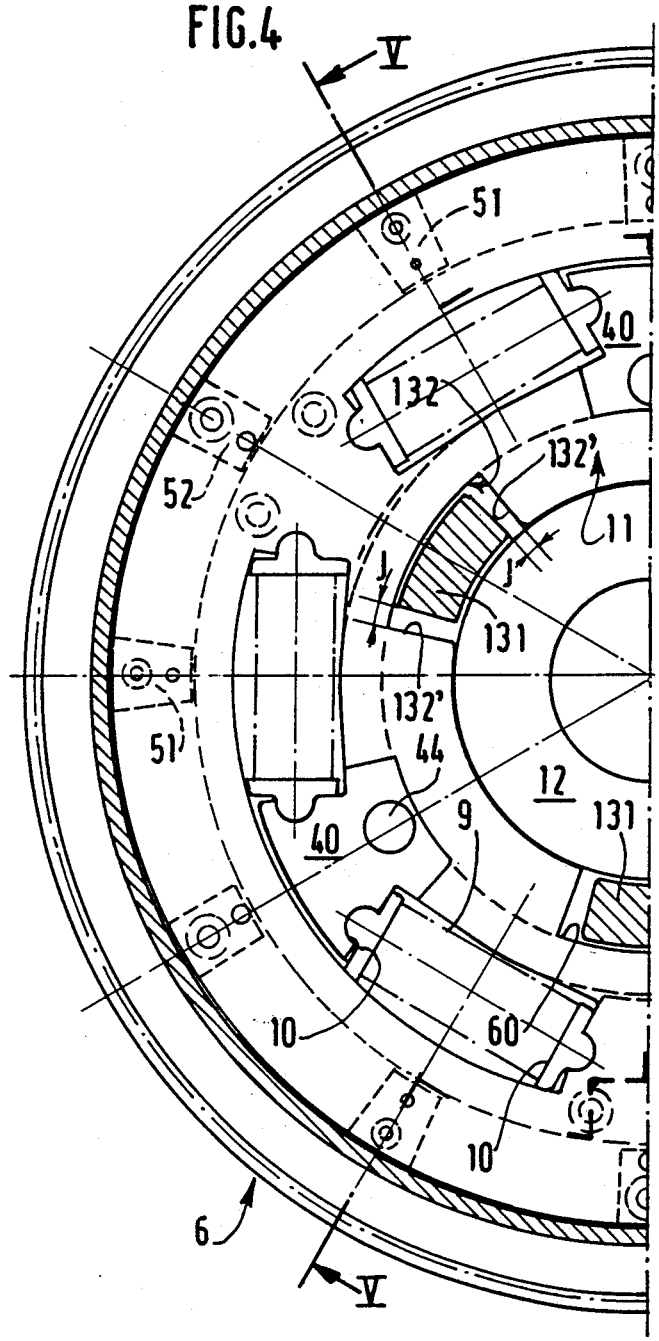
FIG. 4 is a view in radial cross-section showing one half of a double flywheel in a second embodiment of the invention.

Reference will first be made to FIG. 1, in which a first mass 1 is secured to the crankshaft A of the engine of the automobile, by means of threaded fasteners 2 indicated in broken lines.

The mass 1 comprises a face plate 3, which is connected to another face plate 4 by means of an annular spacer 5 which maintains the two face plates at a fixed axial distance from each other. The face plates 3 and 4 are secured together by means of rivets 7 which extend through the spacer 5. The latter also carries an external gear ring 6.

Openings 8 are formed in the face plates 3 and 4, for accommodating circumferentially acting resilient means 9 which in this example consist of coil springs. These springs engage on the circumferential edges of the openings 8 through inserts 10. A damper plate 11 is disposed axially between the face plates 3 and 4, and carries radial arms 11', against which the inserts 10 bear after a clearance, visible in FIG. 2, has been taken up, as is described in the above-mentioned French patent application No. FR 2 593 871A.

The damper plate 11 is mounted coaxially on a support member in the form of a hub 12, which is fixed by means of the fasteners 2 to the face plate 3 and crankshaft A.

A low friction bearing means 13, which in this example is a ball bearing shown diagrammatically, is mounted radially between the hub 12 and a plate 14. The plate 14 serves as the reaction plate of a clutch which also includes a friction disc (not shown), for engagement with the reaction plate 14. The latter is fixed to the input shaft of the gearbox indicated at B in the drawings, for rotation with the input shaft.

The reaction plate 14 is part of a second mass 15, arranged coaxially with the first mass 1 and mounted so as to be rotatable with respect to the first mass, with the bearing 13 being arranged between the two masses. The damper plate 11 is spaced axially from the reaction plate 14 by an axial distance along the hub 12, in the manner described below.

Damping means 16, with friction rings, are arranged to act between the face plate 3 and the damper plate 11. The damping means include a spacer ring 18 which is coupled for rotation with the face plate 3 by means of trunnions 19, which are engaged in holes 20 formed in the face plate 3, with some clearance on either side of each trunnion. Friction liners 21 are arranged on either side of the damper plate 11. One of the liners 21 lies between the spacer ring 18 and the damper plate 11, while the other liner is between the damper plate 11 and a radial flange 22 of the hub 12. A spring 23 is interposed between the face plate 3 and the spacer ring 18, so as to bear on both of them and thereby urge the ring 18 and the damper plate 11 axially towards the flange 22, so locking the ring 18, damper plate 11 and flange 22 together through frictional contact with the friction liners 21.

The flange 22 provides an axial thrust shoulder for the damper plate 11, so that the latter is axially located on the hub 12. The flange 22 also provides an axial shoulder for the bearing 13, with another shoulder 26 being provided on the reaction plate 14 for location of the latter. Two rings are also provided, namely a ring 24 on which the head of the fastener 2 bears, and a ring 25 in the form of a circlip engaged in a groove formed in the reaction plate 14.

In accordance with the invention, a delayed action coupled means 30 is provided between the reaction plate 14 and the damper plate 11. This coupling means defines an initial clearance J between the plates 11 and 14, but sets up a common rotation of the reaction plate 14 and the damper plate 11 after the clearance has been taken up. The means 30 comprise a projection 31 carried by the damper plate 11 and engaging in an elongated, blind opening 32, which extends circumferentially in the plate 14 and has end portions 32'. The projection 31 is in the form of a pin forming part of an axial orientation element, the pin 31 being riveted to the damper plate 11 as seen in FIG. 1. The pin 31 is cylindrical, and the circumferential ends 32' of the opening 32 are of corresponding shape to the pin 31, as can be seen in FIG. 3, i.e. they are semi-circular. At least two of the pins 31 and two openings 32 are of course provided.

In operation, there are two distinct phases. In the first phase, the damper plate 11 is displaced circumferentially with respect to the reaction plate 14 until the pins 31 come into contact with the ends 32' of the openings 32. During this phase, no relative movement occurs between the damper plate 11 and the spacer ring 18. Hysteresis effects are small, since the displacement of the reaction plate 14 with respect to the damper plate 11 takes place through the bearing 13, without direct contact between them.

After the clearance J between the pin 31 and ends 32' has been taken up, the second phase commences in which the damper plate 11 and reaction plate 14 become coupled together for rotation, so that relative movement takes place between the damper plate 11 and the spacer ring 18. This then sets up much larger friction forces.

It will be noted that the springs 9 become compressed only after a clearance has been taken up between fingers 11", carried by the arms 11, and the base 10' of the indentation in each corresponding insert 10. With the engine in a decelerating mode, it is then possible to minimise dead point noise in accordance with the invention by suitable choice of the values of both the above-mentioned clearance and the clearance J, which are then determined according to the particular application.

The damper plate 11, which is freely mounted on the hub 12 for axial sliding movement on the latter, is able to act in the same way as the rings described in the above-mentioned French patent application No. FR 2 593 871A. In other words, the instantaneous position of the damper plate 11 results from the pre-existing operating conditions, and is therefore random. It is even possible it necessary to eliminate the clearance between the arms 11 and the inserts 10.

Figure 5:
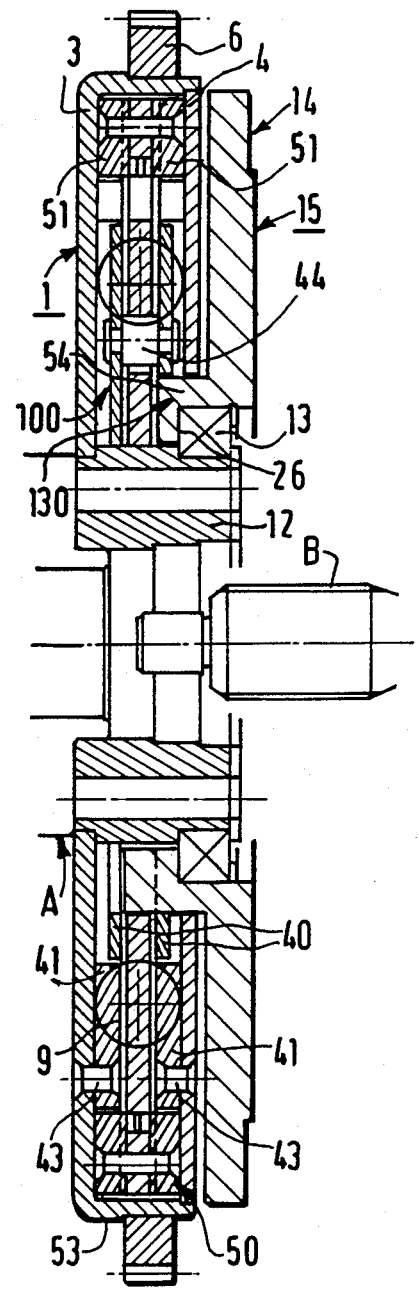
FIG. 5 is a view seen in cross-section on the broken line V—V in FIG. 4.

Referring now to FIGS. 4 and 5, in the modification shown therein the delayed action coupling means, 130, may comprise a tenon 131 carried by the reaction plate 14 and engaged axially, with a clearance, in a mortice 130 of the damper plate 11. In this example there are three tenons 131. In this modified embodiment, phasing rings 40 and guide rings 41 are provided. In greater detail, and considering two consecutive springs 9, the arrangement is as follows. One of the ends of one spring bears indirectly, through the corresponding insert 10, on the two guide rings 41, while its other end bears on the phasing rings 40. As to the other spring 9, one of its ends bears on the phasing ring 40 while its other end bears on the damper plate 11. The guide rings 41 are fixed respectively to the face plates 3 and 4 by means of rivets 43, and are arranged on either side of the damper plate 11 in the same way as the phasing rings 40. The damper plate is centered by the hub 12, and is located axially on the first mass 1, or more particularly between the face plates 3 and 4 at an axial distance from the reaction plate 14, through a viscous damping means 50. This viscous damping means comprises a plurality of blocks 51 which are fixed on the damper plate 11 on either side of the latter. Each block 51 is arranged between a corresponding pair of further blocks 52 carried by the guide rings. Chambers are thus defined between the blocks 51 and 52.

The viscous damping means 50 is disposed radially outwardly of the springs 9, and the face plates 3 and 4 delimit a sealed cavity 100 which is filled with a fluid. As can be seen in FIG. 5, the face plate 3 has an axial flange 53, on which the gear ring 6 is mounted, while the face plate 4 serves to close the cavity 100, with the springs 9 being mounted within this cavity. A sealing joint (not shown) is of course disposed between the inner end of the face plate 4 and the axial flange 54 of the reaction plate 14 which includes the shoulder 26 and a projection or tenon 131. As is best seen in FIG. 4, the tenon 131 is arranged to cooperate with the generally radial circumferential ends 132' of an opening 132 of an opening 132. In this example the opening 132 is not closed at its inner periphery, while its outer periphery 60, the profile of which is generally circular, is such as to allow the damper plate 11 to be centered by cooperation with the outer periphery of the tenon 131, which is of similar circular shape, coaxial (like the profile 60) with the axis of the assembly.

Figure 6:
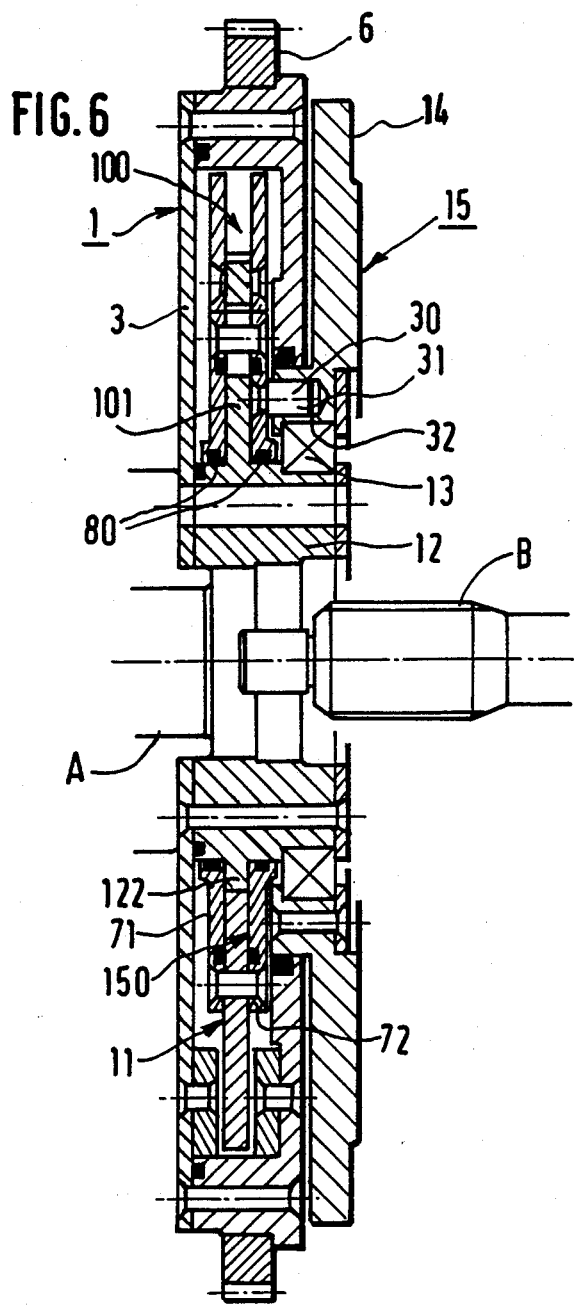
FIG. 6 is a view similar to FIG. 1, but shows, in full axial cross-section, a third embodiment of the invention.

In the embodiment shown in FIG. 6, the viscous damping means, 150, are arranged radially inwardly of the springs 9, which are not shown in FIG. 6.

As in the preceding example, a cavity 100 is delimited by the face plates 3 and 4, and the viscous damping means comprises a closed cavity 101 delimited by two discs 71 and 72, which are secured to the damper plate 11 by riveting. Inside this cavity 101 there are radial fins 122, forming part of the hub 12 and alternating with radial fins formed on the inner periphery of the damper plate 11. As will be understood, the fins 122, together with the flange 22, form a radial projection carried by the hub, the damper plate being axially located by virtue of this projection. The damper plate 11 is axially located on the hub 12 by means of the discs 71 and 72, which are arranged on either side of the fins 122. The cavity 101 is partially filled with a fluid which is a different fluid from that in the cavity 100 around the springs. Joints indicated at 80 are provided for sealing the cavity 101.

As in the arrangement described with reference to FIG. 1, the delayed action coupling means 30 comprise pins 31 engaging in circumferential oblong openings 32 in the reaction plate 14. Here, the pins 31 are carried by the disc 72 adjacent to the reaction plate 14. It will be evident from the drawings and from this description that the opening 32 formed in the reaction plate 14 is a blind hole, so that the reaction plate can offer the maximum possible surface for engagement with the friction disc of the clutch.

The present invention is of course not limited to the embodiments described, but embraces any modifications. In particular, the embodiment of FIGS. 1 and 2 may be combined with that of FIGS. 4 and 5. In this case, it can be seen that the delayed action coupling means may comprise a pin engaged between two mortices with a clearance. As in the foregoing Figures, the pins or tenons and the mortices can be carried by either the damper plate or the reaction plate.

Finally, the bearing means may comprise two rolling bearings or one rolling bearing with two ball races. It is also possible to use as the bearing means a bearing made of plastics material with a low coefficient of friction in place of rolling elements such as balls. The radial projection carried by the hub need not be integral with the latter, and may for example comprise a circlip mounted in a groove in the hub. Similarly, two damper plates, maintained at a fixed axial spacing from each other by means of pins or projections acting as spacers, may be provided. In a modification, a single face plate may be provided, engaging between the two damper plates. In addition, for example in the embodiment of FIG. 1, the flange 22 may be omitted, with a roller bearing then being provided between the reaction plate and the damper plate.

The reaction plate may be divided in the manner described in the above-mentioned French patent application No. FR 2 593 871A, so that it may comprise a reaction plate proper, fixed on a coupling plate which is mounted on the bearing means.

What is claimed is:

1. A double damped flywheel, particularly for an automotive vehicle, of the kind comprising two coaxial masses which are mounted so as to be rotatable relative to each other, a first mass which includes at least one face plate, and a second mass which includes at least one damper plate and a reaction plate, a support member to which said first mass is fixed, bearing means mounted between the reaction plate and the support member, circumferentially acting resilient means mounted between said first and second masses and damping means mounted between said first and second masses, said resilient means and damping means being such as to act on both said first and second masses, characterised in that delayed action coupling means defining a circumferential clearance for initial relative retrotational displacement between the reaction plate and damper plate, are provided between the reaction plate and damper plate, in such a way as to produce a common rotation of the reaction plate and the damper plate after the clearance has been taken up, and the damping means operating after the clearance has been taken up.

2. A double damped flywheel according to claim 1, wherein the delayed action coupling means comprise a projection carried by a first element selected from the reaction plate and the damper plate, and engaging, with the clearance, in an opening delimited by circumferential ends thereof and formed in an other of a second element selected from the reaction plate and the damper plate.

3. A double damped flywheel according to claim 2, characterised in that the said projection comprises a pin carried by the damper plate and engaging in an oblong opening formed in the reaction plate.

4. A double damped flywheel according to claim 2, wherein said projection comprises a tenon carried by the reaction plate and engaging in a mortice formed in the damper plate.

5. A double damped flywheel according to claim 1, wherein the damper plate is located axially on the first mass, at a spaced distance, by means of at least one shoulder fixed to said first mass.

6. A double damped flywheel according to claim 5, characterised in that the damper plate is located axially on a hub constituting the said support member on which the bearing means are mounted, the hub having a radial projection for location of the damper plate with respect thereto.

7. A double damped flywheel according to claim 6, in which the damping means comprise a spacer ring and a spring, mounted between and in engagement with a said face plate of the first mass with the spring acting on the spacer ring, characterised in that the said spring is arranged to bias the spacer ring and the damper plate towards a flange constituting the said radial projection of the hub.

8. A double damped flywheel according to claim 6, in which the damping means include viscous damping means, characterised in that the damper plate is axially located, on fins fixed with respect to the hub, by means of two discs coupled with the damper plate.

9. A double damped flywheel according to claim 5, in which two face plates are provided, together with viscous damping means, characterised in that the damper plate is disposed axially between the face plates, and is spaced axially from each face plate.

* * * * *